(12) United States Patent
Morita et al.

(10) Patent No.: US 8,939,196 B2
(45) Date of Patent: Jan. 27, 2015

(54) SECONDARY PUMP TYPE HEAT SOURCE AND SECONDARY PUMP TYPE HEAT SOURCE CONTROL METHOD

(75) Inventors: Takeru Morita, Fuji (JP); Yuuji Matsumoto, Fuji (JP); Seiji Tsukiyama, Fuji (JP); Manabu Yamamoto, Fuji (JP)

(73) Assignee: Toshiba Carrier Corporation, Tokyo (JP)

( * ) Notice: Subject to any disclaimer, the term of this patent is extended or adjusted under 35 U.S.C. 154(b) by 835 days.

(21) Appl. No.: 13/201,192

(22) PCT Filed: Feb. 8, 2010

(86) PCT No.: PCT/JP2010/051755
§ 371 (c)(1),
(2), (4) Date: Nov. 16, 2011

(87) PCT Pub. No.: WO2010/092916
PCT Pub. Date: Aug. 19, 2010

(65) Prior Publication Data
US 2012/0055665 A1     Mar. 8, 2012

(30) Foreign Application Priority Data

Feb. 13, 2009   (JP) ................. 2009-031116

(51) Int. Cl.
*F24F 11/02*     (2006.01)
*F24F 11/00*     (2006.01)

(52) U.S. Cl.
CPC ....... *F24F 11/008* (2013.01); *F24F 2011/0045* (2013.01)
USPC ........... 165/219; 165/247; 165/293; 165/295; 165/50; 165/11.1; 700/276; 700/278; 62/99; 62/175; 62/180; 62/185; 62/189; 62/201; 62/205; 62/207; 62/435

(58) Field of Classification Search
USPC ............... 165/219, 50, 247, 293, 295, 11.1; 700/276, 278; 62/175, 185, 201, 189, 62/435, 180, 205, 207, 99
See application file for complete search history.

(56) References Cited

U.S. PATENT DOCUMENTS

| | | | | |
|---|---|---|---|---|
| 3,202,208 A | * | 8/1965 | Geiringer | 165/50 |
| 4,463,574 A | * | 8/1984 | Spethmann et al. | 62/175 |
| 4,482,006 A | * | 11/1984 | Anderson | 165/11.1 |
| 4,483,152 A | * | 11/1984 | Bitondo | 62/201 |
| 4,574,870 A | * | 3/1986 | Weitman | 165/292 |

(Continued)

FOREIGN PATENT DOCUMENTS

| | | |
|---|---|---|
| JP | 61-225534 | 10/1986 |
| JP | 2-219940 | 9/1990 |

(Continued)

OTHER PUBLICATIONS

International Search Report issued in PCT/JP2010/051755 on May 11, 2010.

(Continued)

*Primary Examiner* — John Ford
(74) *Attorney, Agent, or Firm* — DLA Piper LLP (US)

(57) ABSTRACT

A secondary pump-type heat source system includes: heat sources connected in parallel; a load system in which the heat source water flows; a primary pump supplying the heat source water to the load system; a secondary pump provided for each heat source and supplies the heat source water subjected to heat exchange in the load system to the heat source; and a heat source controller calculating flow quantity of the heat source water flowing in the heat source side and flow quantity of the heat source water flowing in the load system side by assigning a result from measurement by a water temperature sensor detecting heat source temperature to an operating characteristic of each heat source and controlling operation of the secondary pumps based on the calculation result.

5 Claims, 5 Drawing Sheets

(56) References Cited

U.S. PATENT DOCUMENTS

| | | | |
|---|---|---|---|
| 5,070,704 A * | 12/1991 | Conry | 62/435 |
| 5,138,845 A * | 8/1992 | Mannion et al. | 165/219 |
| 5,946,926 A * | 9/1999 | Hartman | 62/201 |
| 6,449,969 B1 * | 9/2002 | Fujimoto et al. | 62/201 |
| 7,028,768 B2 * | 4/2006 | Aler et al. | 165/219 |
| 2005/0166609 A1 * | 8/2005 | Thybo et al. | 62/129 |

FOREIGN PATENT DOCUMENTS

| | | |
|---|---|---|
| JP | 05223318 A * | 8/1993 |
| JP | 2004-101104 | 4/2004 |
| JP | 2005-337594 | 12/2005 |
| JP | 2006-132918 | 5/2006 |
| JP | 2006-275397 | 10/2006 |
| JP | 2008-241326 | 10/2008 |

OTHER PUBLICATIONS

English Language Abstract of JP 2004-101104 published Apr. 2, 2004.

English Language Translation of JP 2004-101104 published Apr. 2, 2004.

English Language Abstract of JP 02-219940 published Sep. 3, 1990.

English Language Abstract of JP 2008-241326 published Oct. 9, 2008.

English Language Translation of JP 2008-241326 published Oct. 9, 2008.

English Language Abstract of JP 2005-337594 published Dec. 8, 2005.

English Language Translation of JP 2005-337594 published Dec. 8, 2005.

English Language Abstract of JP 2006-132918 published May 25, 2006.

English Language Translation of JP 2006-132918 published May 25, 2006.

English Language Abstract of JP 2006-275397 published Oct. 12, 2006.

English Language Translation of JP 2006-275397 published Oct. 12, 2006.

* cited by examiner

ସECONDARY PUMP TYPE HEAT SOURCE AND SECONDARY PUMP TYPE HEAT SOURCE CONTROL METHOD

TECHNICAL FIELD

The present invention relates to a secondary pump-type heat source system and a method of controlling the secondary pump-type heat source system.

BACKGROUND ART

In the case where a plurality of indoor systems (fan coil units) are installed in a place such as a large-scale factory or building, for example, a heat source system has been used in which heat source water (cold or hot water) is supplied from a heat source to these indoor systems for air conditioning of plural air-conditioning areas. This heat source system is roughly separated into a heat source side and a load system side (an indoor system side), which are connected to each other through a water supply pipe and a water return pipe to form one circuit. By the water supply pipe, heat source water is supplied from the heat source to a load system, and by the water return pipe, the heat source water is returned through the load system to the heat source again.

For example, the heat source water subjected to heat exchange within the heat source is supplied by a primary pump through the water supply pipe to the load systems such as air conditioning systems or fan coils. This heat source water is subjected to heat exchange within the load systems and then supplied to the secondary pump through the water return pipe. The heat source water supplied to the secondary pumps goes through the heat source again, thus circulating in the circuit. Herein, generally, the heat source system is provided with a bypass pipe which bypasses the water supply and return pipes between the heat source side and load system side in order to cope with imbalance between the flow quantity of heat source water flowing in the heat source side and the flow quantity of heat source water flowing in the load system side.

At this time, in order to set temperature of the heat source water supplied to the load systems to a setting value or to operate the heat source at higher efficiency, it is desirable to adjust and equalize the flow quantity of heat source water flowing in the heat source side and the flow quantity of heat source water flowing in the load system side. For the purpose of measuring the flow quantity of heat source water flowing in the heat source side or in the load system side, in many cases, flow meters are provided both in the heat source side and load system side (see Patent Literature 1 below) or only in the load system side (see Patent Literature 2 below).

CITATION LIST

[Patent Literature] PTL: 1 Japanese Patent Laid-open Publication No. 2006-275397
[Patent Literature] PTL: 2 Japanese Patent Laid-open Publication No. 2004-101104

SUMMARY OF INVENTION

Technical Problem

However, in the invention disclosed in Patent Literature 1 or 2 above, it is necessary to install a flow meter in any one place. Installation of the flow meter certainly requires the installation cost. Moreover, a larger heat source system needs a larger flow meter, and the expensive flow meter will increase the facility cost of the entire system.

In the invention disclosed, in Patent Literature 2, the aforementioned flow meter is installed only in the load system side. In this term, this invention can ease the problems of the facility cost and the like to some extent. However, it is necessary to examine the relation between the flow quantity of heat source water and performances of the secondary and primary pumps in each site where the heat source system is installed and operate the system based on the result thereof, causing a complication.

The present invention was made to solve the aforementioned problem, and an object of the present invention is to provide a secondary pump-type heat source system and a secondary pump-type heat source controlling method which are capable of properly responding to changes in the load system side without a flow meter and performing an efficient control to contribute to energy saving.

Solution to Problem

A first aspect according to an embodiment of the present invention is a secondary pump-type heat source system, including: a plurality of heat sources which are connected in parallel and generate heat source water; a load system in which the heat source water flows; a primary pump supplying the heat source water to the load system; a water supply pipe connecting an outlet of the heat source and the load system; a secondary pump which is provided for each heat source and supplies the heat source water subjected to heat exchange in the load system to the heat source; a water return pipe connecting the outlet of the load system and the secondary pumps; a bypass pipe allowing the water supply pipe and the water return pipe to communicate with each other; a water temperature sensor detecting temperature of the heat source water; and a heat source controller calculating flow quantity of the heat source water flowing in the heat source side and flow quantity of the heat source water flowing in the load system side by assigning a result from measurement by the water temperature sensor to an operation characteristic of each of the heat sources and controlling operation of the secondary pumps based on a result from the calculation.

A second aspect according to the embodiment of the present invention is a method of controlling a secondary pump-type heat source including: a plurality of heat sources which are connected in parallel and generate heat source water; a load system in which the heat source water flows; a primary pump supplying the heat source water to the load system; a water supply pipe connecting an outlet of the heat source and the load system; a secondary pump which is provided for each heat source and supplies the heat source water subjected to heat exchange in the load system to the heat source; a water return pipe connecting the outlet of the load system and the secondary pumps; and a bypass pipe allowing the water supply pipe and the water return pipe to communicate with each other. The method includes: calculating flow quantity of the heat source water flowing in the heat source side and flow quantity of the heat source water flowing in the load system side based on the temperature of the heat source water; and determining whether to increase or decrease the number of secondary pumps in operation to reduce a difference between the flow quantity in the heat source side and the flow quantity in the load system side based on the calculated flow quantities in the heat source side and load system side.

Advantageous Effects of Invention

According to the present invention, it is possible to provide a secondary pump-type heat source system and a method of controlling the secondary pump-type heat source system which are capable of accurately responding to changes in the load system side without flow meters and performing high efficiency control to contribute energy saving.

DESCRIPTION OF EMBODIMENT

Hereinafter, a description is given of an embodiment of the present invention in detail with reference to the drawings.

Figure 1:
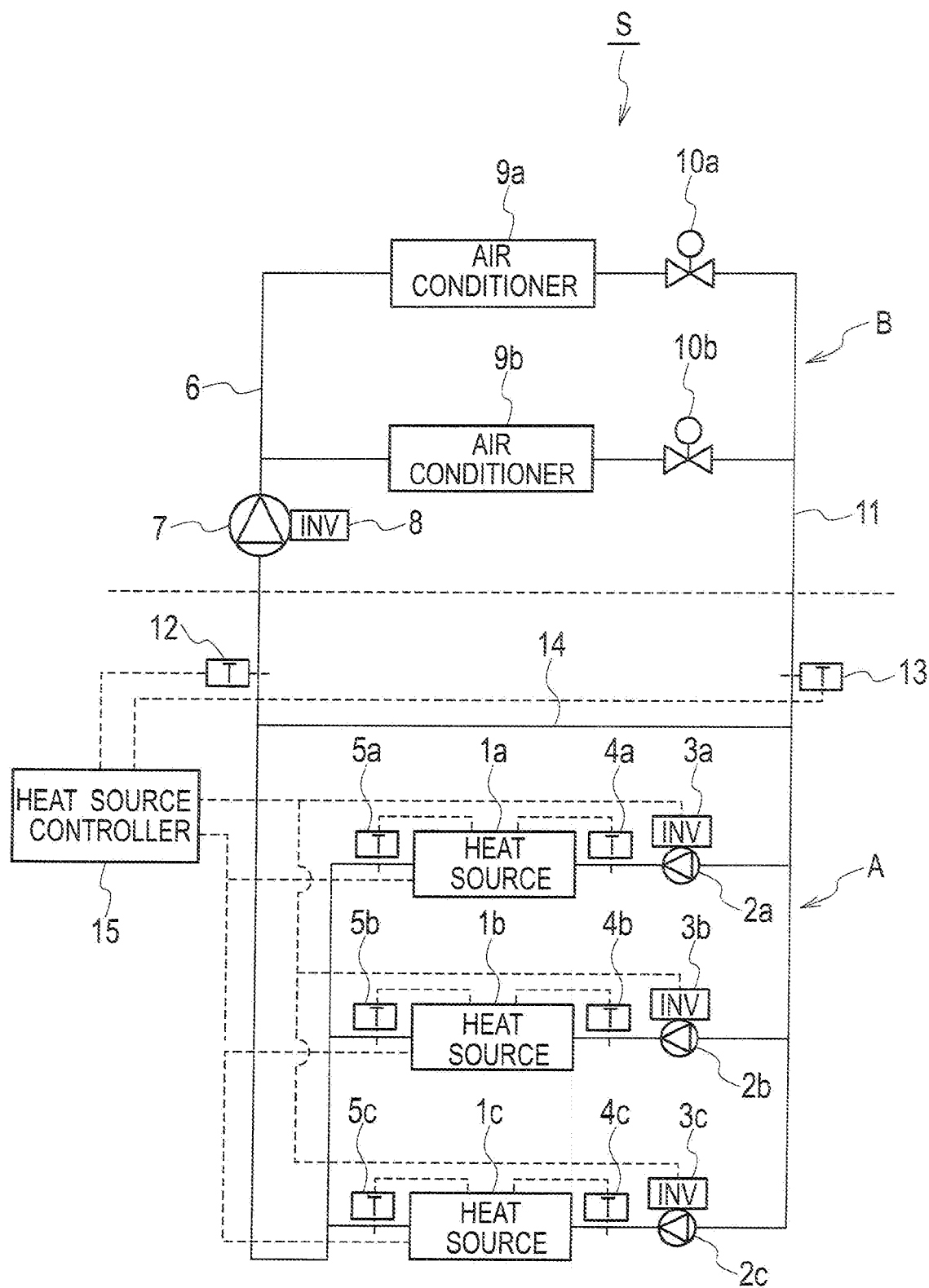
FIG. 1 is an entire view showing a secondary pump-type heat source system according to an embodiment of the present invention.

FIG. 1 is an entire view showing a secondary pump-type heat source system S according to the embodiment of the present invention. The secondary pump-type heat source system S is roughly separated into a heat source side A and a load system side B as indicated by a dashed line of FIG. 1.

In the heat source side A, heat sources 1 generating heat source water and secondary pumps (heat source side pumps) 2 supplying circulated heat source water to the heat sources 1 are provided. Each heat source 1 includes a compressor, a four-way valve, a heat exchanger, a throttle mechanism, and a water heat exchanger, which are connected with pipes and not shown in the drawings. The pipes are filled with a refrigerant. The refrigerant circulates sequentially in the compressor, heat exchanger, throttle mechanism, and water heat exchanger, thus constituting a refrigerant circuit.

To be specific, the compressor sucks and compresses the refrigerant and discharges the refrigerant at high temperature and pressure. An end of the compressor on the discharge side is connected to the heat exchanger including a fan. In the heat exchanger, the refrigerant exchanges heat with air through ventilation by the fan. The water heat exchanger is connected to the throttle mechanism, and the refrigerant going through the throttle mechanism then passes through the water heat exchanger. In the water heat exchanger, the refrigerant exchanges heat with water flowing through a pipe separately connected to the water heat exchanger to generate heat source water. The refrigerant then enters the compressor again. The four-way valve is switched to reverse the flow of the refrigerant, so that the refrigerant discharged from the compressor flows through the water heat exchanger, throttle mechanism, and heat exchanger and then returns to the compressor. The heat source therefore generates any of cold water for cooling/refrigeration and hot water for heating/warming.

The secondary pumps 2 supplying heat source water to the heat sources 1 are individually provided for the respective heat sources 1. The secondary pumps 2 are connected to respective secondary pump inverters 3 and are operated by the secondary pump inverters 3 based on an instruction from a later-described heat source controller so as to change in speed. The secondary pumps 2 have a same specification (an input-flow quantity characteristic). Moreover, in order to simplify the control, the performances of the secondary pumps 2 in operation or outputs of the secondary pump inverters 3 are controlled so as to be the same.

Heat source inlet and outlet water temperature sensors 4 and 5 are connected to around the inlet and outlet of each heat source 1, respectively. The heat source inlet water temperature sensor 4 measures temperature of heat source water to be supplied to the heat source 1. The heat source outlet water temperature sensor 5 measures temperature of heat source water discharged from the heat source 1 to be supplied to the load systems.

In FIG. 1, three heat sources 1 are connected in parallel (hereinafter, these are collectively referred to as the heat sources 1 unless otherwise necessary), and the number of the heat sources 1 connected should be at least two or more. Moreover, since each heat source 1 is necessarily connected to one of the secondary pumps 2, the number of heat sources 1 is the same as the number of secondary pumps 2. Furthermore, each secondary pump 2 is connected to one of the secondary pump inverters 3. Each heat source 1 is connected to the corresponding heat source inlet and outlet water temperature sensors 4 and 5 as described above. Hereinafter, the heat source 1, secondary pump 2, secondary pump inverter 3, heat source inlet and outlet water temperature sensors 4 and 5 are collectively referred to as a heat source unit.

The heat source water generated in the heat sources 1 is supplied to the load system side B through a water supply pipe 6 with an end connected to the outlet of each heat source 1. The other end of the water supply pipe 6 is connected to a primary pump (load-side pump) 7 and a primary pump inverter 8 controlling the primary pump 7. The heat source water is thus fed to load systems 9.

The primary pump 7 is driven by the primary pump inverter 8 so as to change in speed so that the flow quantity of the heat source water to be supplied to the load systems 9 is controlled. The output (flow quantity) of the primary pump 7 is controlled according to the cooling and heating performance required by the load systems 9 independently of the operation in the heat source side. The load systems 9 are air conditioners such as fan coils, for example. In FIG. 1, two load systems 9a and 9b are connected in parallel (hereinafter, the load systems 9a and 9b are Collectively referred to as the load systems 9). The number of load systems 9 connected may be any number.

The heat source water subjected to heat exchange in the load systems 9 flows in a water return pipe 11 through, two-way valves 10 connected to the outlet of each load systems 9 to be fed to the secondary pumps 2 in the heat source side A.

Between the heat sources 1 and primary pump 7, a supply water temperature sensor 12 measuring temperature of heat source water flowing in the water supply pipe 6 is provided. Between the load systems 9 and secondary pumps 2, a return water temperature sensor 13 measuring temperature of heat source water flowing in the water return pipe 11 is provided. A bypass pipe 14 is provided so as to allow the water supply pipe 6 between the heat sources 1 and supply water temperature sensor 12 to communicate with the water return pipe 11 between the return water temperature sensor 13 and secondary pumps 2.

In other words, the return water temperature sensor 13 is attached to the water return pipe 11 at, the load system 9 side of the connection between the water return pipe 11 and bypass pipe 14, and the supply water temperature sensor 12 is attached to the water supply pipe 6 on the load system 9 side of the connection between the water supply pipe 6 and bypass pipe 14.

The heat source controller 15 is a controller Configured to operate and control each device installed in the heat source side A. In FIG. 1, the three heat sources 1 connected, for example, are individually operated and controlled based on an instruction from the heat source controller 15. The measurement results from the supply and return water temperature sensors 12 and 13 are collected to the heat source controller 15, and information on temperature measured by the heat source inlet and outlet water temperature sensors 4 and 5 are also collected to the heat source controller 15 through the heat sources 1.

Figure 2:
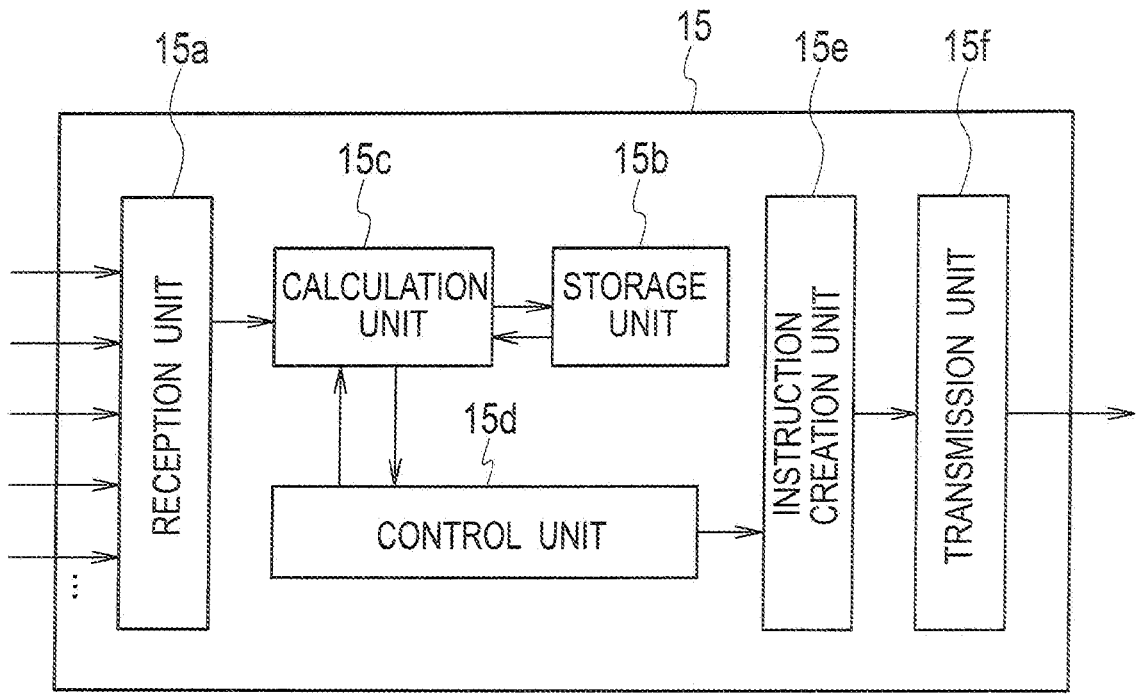
FIG. 2 is a block diagram showing an internal configuration of a heat source controller according to the embodiment of the present invention.

FIG. 2 is a block diagram showing an internal configuration of the heat source controller 15. The heat source controller 15 includes a reception unit 15a, a storage unit 15b, a calculation unit 15c, a control unit 15d, an instruction creation unit 15e, and a transmission unit 15f.

The reception unit 15a receives water temperature information from the temperature sensors, including the supply and return water temperature sensors 12 and 13 and the heat source inlet and outlet water temperature sensors 4 and 5 of each heat source 1 through the heat source 1, for example. The storage unit 15b stores equations expressing operating characteristics of the heat sources 1 to be subjected to later-described control. The calculation unit 15c assigns the measurement result transmitted from each temperature sensor to the equations stored in the storage unit 15b to calculate the flow quantity of heat source water flowing in the heat source side A and the flow quantity of heat source water flowing in the load system side B.

The control unit 15d makes a control instruction for each heat source 1 or each secondary pump 2 based on the result calculated by the calculation unit 15c. The instruction creation unit 15e creates an actual instruction to each heat source 1 based on the instruction from the control unit 15d. The transmission unit 15f plays a role of transmitting the instruction to each heat source 1 and the inverter 3 of each secondary pump 2.

Next, a description is given of a method by which the heat source controller 15 controls the secondary pump-type heat source system S in the embodiment of the present invention together with the operation of each of the aforementioned units in the heat source controller 15.

Figure 3:
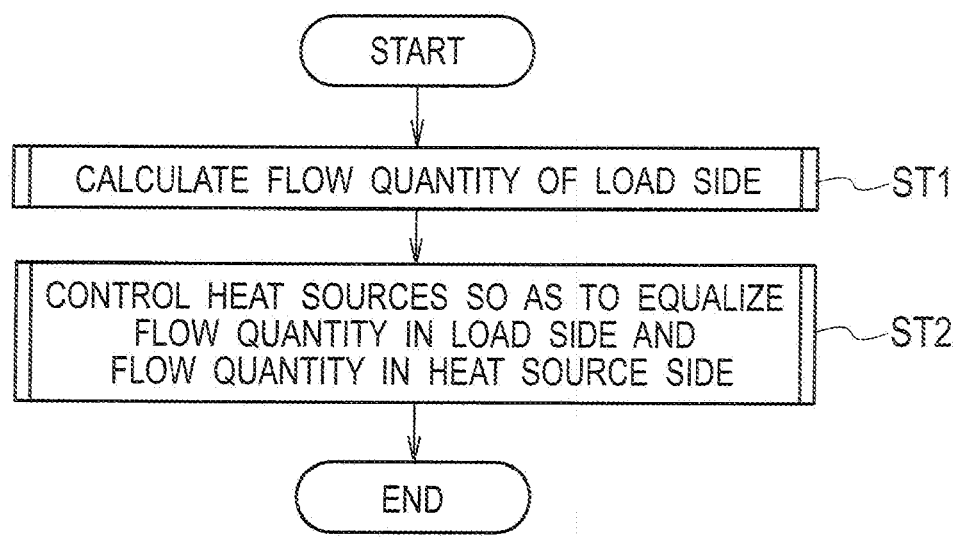
FIG. 3 is a flowchart roughly showing a flow concerning a method of controlling the secondary pump-type heat source system according to the embodiment of the present invention.

FIG. 3 is a flowchart roughly showing a flow concerning the method of controlling the secondary pump-type heat source system S. The control of the secondary pump-type heat source system S is performed roughly in two steps. In the first step (ST1), the total flow quantity of heat source water flowing in the load system side B is calculated. In the second step (ST2), based on the calculated flow quantities in the heat source and load system sides A and B, the heat source controller 15 determines the performances (flow quantities) of the secondary pumps 2 and whether to increase or decrease the number of secondary pumps 2 in operation so as to minimize the difference between the flow quantities in the heat source side A and load system side B and controls the secondary pump inverters 3.

Figure 4:
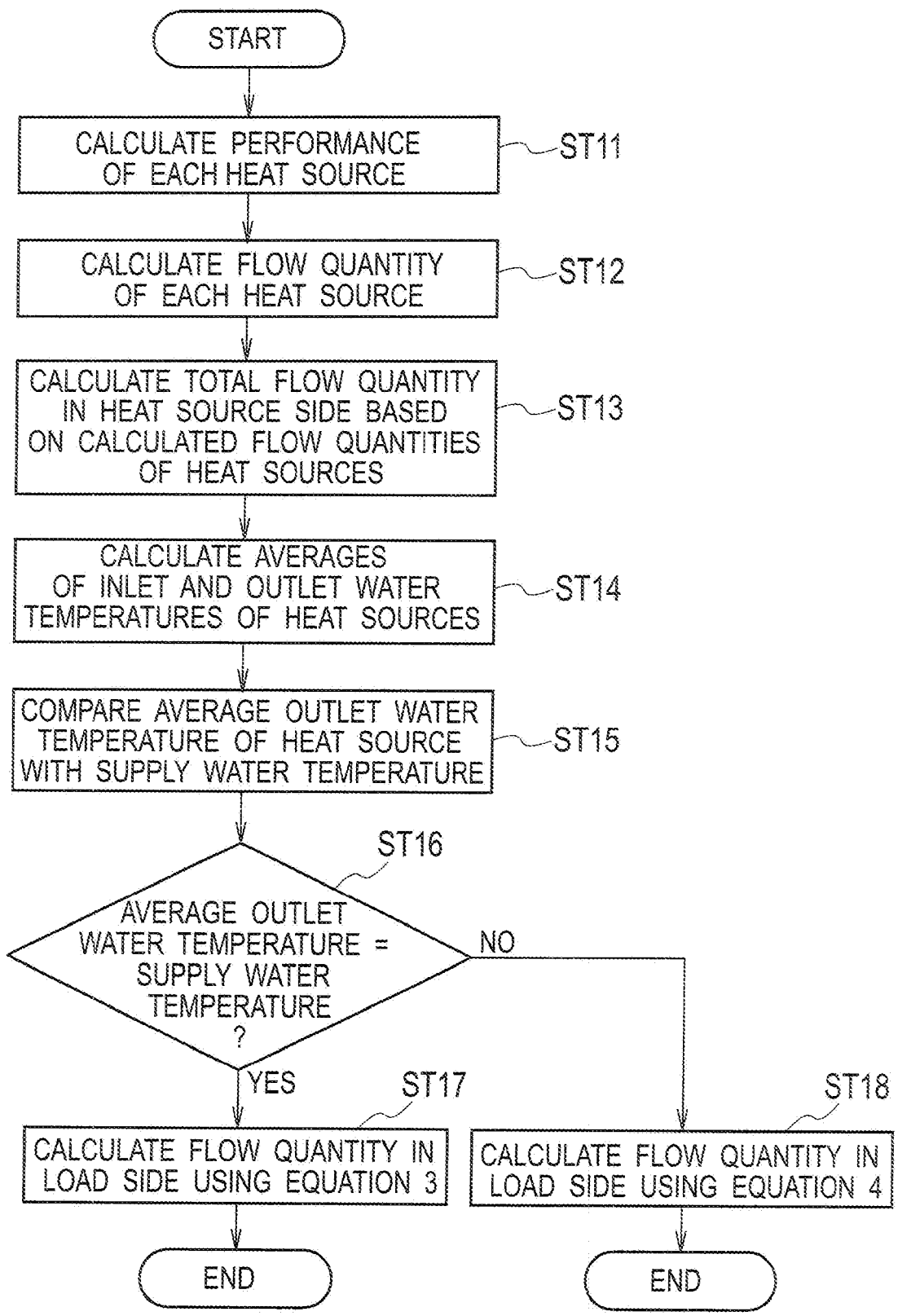
FIG. 4 is a flowchart showing a flow of calculating the total flow quantity of heat source water flowing in a load system side in the embodiment of the present invention.

The flowchart shown in FIG. 4 is to describe the flow (ST1) of calculating the total flow quantity of the heat source water flowing in the load system side B in detail. First, the performance of each heat source 1 is calculated (ST11). The installed heat sources 1 are not necessarily devices of a same type. Even if the heat sources 1 are devices of a same type, the heat sources 1 have slightly different performances in many cases. Accordingly, the performance of each heat source 1 is recognized at first.

To be specific, each heat source 1 is operated, and the freezing or heating performance is calculated based on the saturated condensing temperature and saturated evaporating temperature. However, it is not efficient to calculate the performance of each heat source 1 each time the heat source 1 is operated. Accordingly, the heat sources 1 are experimentally operated in advance, and the relation among the operating performance, saturated condensing temperature, and saturated evaporating temperature is obtained and expressed as an equation, for example. Since such equations are stored in the storage unit 15b, the calculation unit 15c can calculate the performances of the heat sources 1 upon receiving the information concerning the saturated condensing temperature and saturated evaporating temperature from the heat sources 1.

After the performances of the heat sources 1 are calculated, the flow quantity of heat source water flowing in each heat source 1 is calculated using the following equation (ST12). To be specific, the temperature information measured by the heat source inlet and outlet water sensors 4 and 5 is received by the reception unit 15a and is then transmitted to the calculation unit 15c. The calculation unit 15c extracts an equation stored in the storage unit 15b according to the operating state of the heat source 1 and assigns the temperature information measured by the heat source inlet and outlet water sensors 4 and 5 to the extracted equation to calculate the flow quantity of heat source water flowing in the heat source 1. This calculation of the flow quantity is performed for each heat source 1 (each heat source unit) connected to the secondary pump-type heat source system S. Accordingly, it is possible to know the individual flow quantity of each heat source 1 (each heat source unit).

In the case where the heat sources 1 perform cooling operation, the following equation described in Equation 1 is used. On the other hand, in the case where the heat sources 1 perform heating operation, the following equation described in Equation 2 is used. Herein, q is flow quantity of heat source water flowing through each heat source 1 (liter/min); Wc, freezing performance of the heat source 1 (kW); Wh, heating performance of the heat source 1 (kW); Te, water temperature (° C.) measured at the heat source inlet by the heat source inlet water temperature sensor 4; and Tl, water temperature measured (° C.) at the heat source outlet by the heat source outlet water temperature sensor 5.

$$q = \frac{860 W_c}{(T_e - T_l)/60} \quad \text{[Equation 1]}$$

$$q = \frac{860 W_h}{(T_l - T_e)/60} \quad \text{[Equation 2]}$$

The heat sources 1 generate heat source water based on return water fed from the secondary pumps 2. This is carried out because both of the heat source 1 and secondary pump 2 of a same heat source unit are in operation. In such a case, the flow quantity of heat source water flowing through the heat source of interest can be calculated.

However, in some temporary operating states of the secondary pump-type heat source system S, there are some heat source units in each of which the secondary pump 2 is in operation but the heat source 1 is not in operation. Such a state occurs when the required performance of the load system side B is decreasing. The aforementioned Equation 1 or 2 cannot be used in this case, and the flow quantity of heat source water flowing through the heat source 1 cannot be calculated.

Accordingly, in such a state, the flow quantities q calculated for the heat source units in which both of the heat source 1 and secondary pump 2 are in operation are added up. The flow quantity calculated by the addition is divided by the number of heat source units in which the heat source 1 and secondary pump 2 are both in operation, thus calculating the average flow quantity of heat source water flowing in the heat sources 1 of the heat source units in which the heat source 1 and secondary pump 2 are both in operation. This average flow quantity is considered as the flow quantity q in a heat source unit in which the secondary pump 2 is in operation while the heat source 1 is not in operation.

Herein, all of the secondary pumps 2 are configured to have a same specification, and the inverters 3 driving the secondary pumps 2 in operation are configured to have a same output frequency. Accordingly, there is no large error even if the secondary pump 2 is assumed to be in operation with the average flow quantity of heat source water flowing through the heat sources 1 of the operating heat source units and the average flow quantity is assumed to be the flow quantity in the heat source unit in which the heat source 1 is not in operation.

On the other hand, in the heat source unit in which neither the heat source 1 nor secondary pump 2 are in operation, the flow quantity q of heat source water is considered to be 0.

The flow quantities q of the heat sources 1 (heat source units) which are calculated through the above-described calculation by the calculation unit 15c are added up by the calculation unit 15c to calculate total flow quantity Q1 of heat source water flowing in the heat source side A (ST13).

Next, averages of inlet and outlet water temperatures of the heat sources 1 are calculated (ST14). The calculation unit 15c receives through the reception unit 15a the information concerning the inlet and outlet water temperatures measured by the heat source inlet and outlet water temperature sensors 4 and 5 and calculates the averages. The averages of the inlet and outlet water temperatures of the heat sources 1 are calculated as described above because the averages are necessary for calculating the flow quantity of heat source water flowing in the load system side B without using a flow meter.

Herein, with regardless of whether the heat sources 1 are in operation, the inlet and outlet water temperatures used to calculate the averages are limited to temperatures measured by the heat source inlet and outlet temperature sensors 4 and 5 of the heat source units in which the secondary pumps 2 are in operation. This is because the heat source water flows through the water supply pipe 6 to be supplied to the load system side B when the secondary pumps 2 are in operation regardless of whether the heat sources 1 are in operation.

The average outlet water temperature of the heat sources 1 calculated by the calculation unit 15c is transmitted to the control unit 15d. The controller 15d collects also the information concerning the temperature of supply water measured by the supply water temperature sensor 12. The control unit 15d compares the average outlet water temperature with the supply water temperature (ST15).

As a result of comparison, if the average outlet water temperature is equal to the temperature of supply water (YES in ST16), it is determined that heat source water discharged from the heat source 1 and flown through the water supply pipe 6 (hereinafter, such heat source water is properly referred to as supply water) flows directly to the load systems 9 through the primary pump 7. Herein, it is obvious that the temperature of the supply water is different from that of the return water (the temperature of the supply water is lower or higher than that of the return water), and the return water flowing into the supply water pipe 6 via the bypass pipe 14 (the return water flowing in the bypass pipe 14 shown in FIG. 1 from the right to the left) causes a difference between the temperature of the supply water and the average outlet water temperature.

However, the average outlet water temperature being equal to supply water temperature does not always mean that the flow quantity of heat source water flowing in the heat source side A is equal to the flow quantity of heat source flowing in the load system side B. The average outlet water temperature can be equal to the supply water temperature when the flow quantity of heat source water flowing in the heat source side A is higher than that in the load system side B in addition to the case where the flow quantity of heat source water flowing in the heat source side A is equal to that in the load system side B. If the flow quantity of heat source water flowing in the heat source side A is higher than that in the load system side B, supply water flows into the water return pipe 11 via the bypass pipe 14 (the supply water flows in the bypass pipe 14 shown in FIG. 1 from the left to the right).

As described above, if the average outlet water temperature is equal to the supply water temperature (YES in ST16), the calculation unit 15 calculates a total flow quantity Q2 of heat source water flowing in the load system side B using an equation expressed in Equation 3 below (ST17). In this case, the total flow quantity Q2 of heat source water flowing in the load system side B is equal to a difference between the total flow quantity Q1 of the heat source side A and the flow quantity of heat source water flowing in the bypass pipe 14. Moreover, the temperatures of heat source water flowing to the heat sources 1 through the water return pipe 11, that is, the temperatures measured by the heat source inlet water temperature sensors 4 are lower than that measured by the return water temperature sensor when the heat sources 1 are in refrigerating (cooling) operation and are higher than that measured by the return water temperature sensor 13 when the heat sources 1 are in heating (warming) operation. Accordingly, the following equation expressed in Equation 3 is used.

$$Q_2 = \left(1 - \frac{T_2 - T_1}{T_3 - T_1}\right) \qquad \text{[Equation 3]}$$

On the other hand, when the average outlet water temperature is not equal to the supply water temperature (NO in ST16), it is determined that the return water flows from the water return pipe 11 into the water supply pipe 6 via the bypass pipe 14. This means that the total flow quantity of heat source water flowing in the load system side B is higher than that of heat source water flowing in the heat source side A. Accordingly, the total flow quantity Q2 of heat source water flowing in the load system side B is obtained by adding the total flow quantity Q1 of heat source water flowing in the heat source side A to the flow quantity of heat source water flowing in the bypass pipe 14.

The cases where the average outlet water temperature is not equal to the supply water temperature include both of the case where the average outlet water temperature is higher than supply water temperature and the case where the average outlet water temperature is lower than supply water temperature in the former case, the heat sources 1 are in refrigerating (cooling) operation, and in the latter case, the heat sources 1 are in heating (warming) operation. Accordingly, the calculation unit 15c extracts an equation expressed as Equation 4 below from the storage unit 15c and calculates the total flow quantity Q2 of heat source water flowing in the load system side B (ST18).

$$Q_2 = \left(1 + \frac{T_3 - T_4}{T_4 - T_1}\right) \qquad \text{[Equation 4]}$$

By the aforementioned procedure, the total flow quantity Q2 of heat source water flowing in the load system side B can be calculated.

Figure 5:
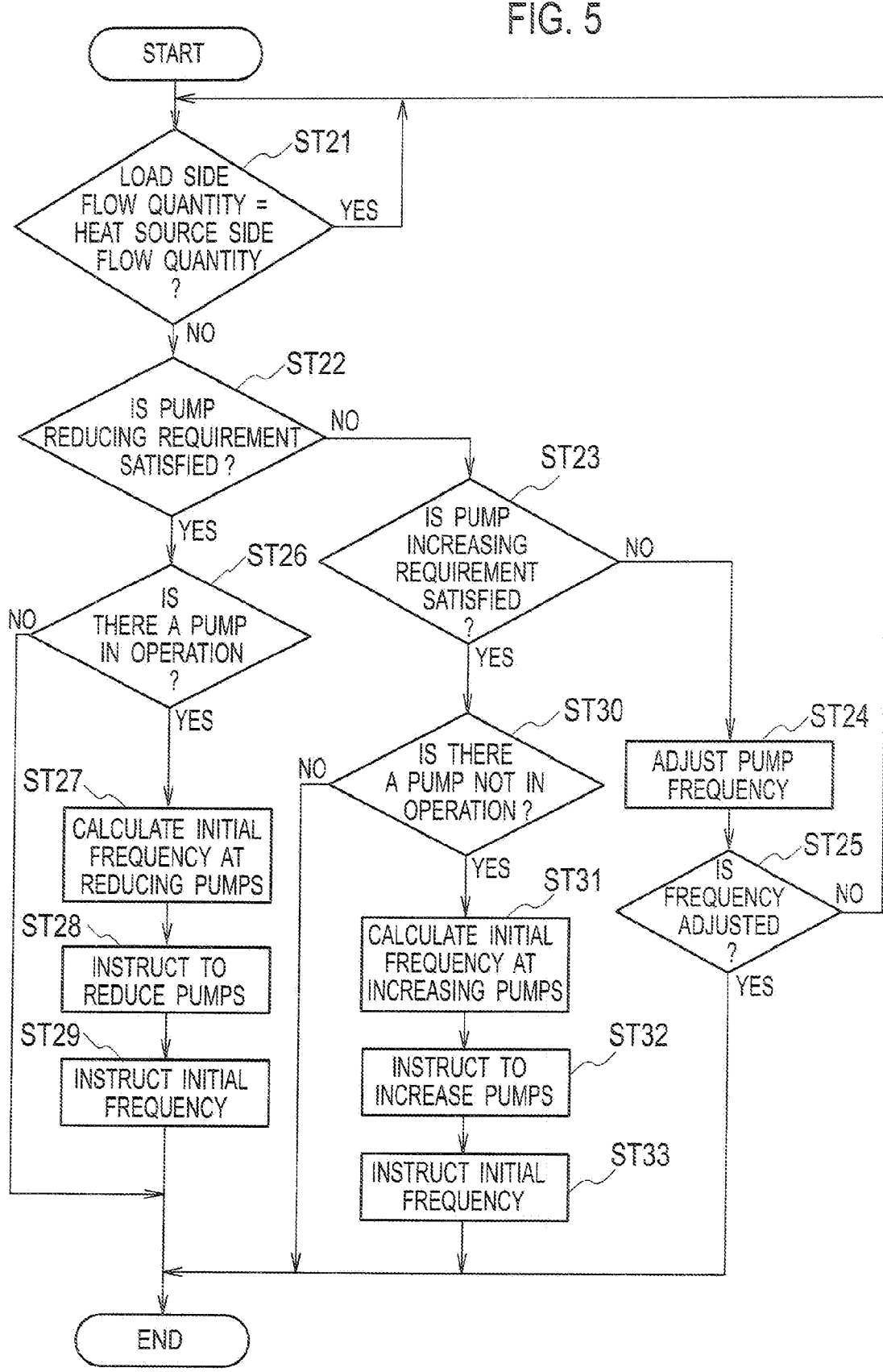
FIG. 5 is a flowchart showing a flow of the heat source controller controlling the heat source so as to equalize the total flow quantity of heat source water flowing in the load system side and the total flow quantity of heat source water flowing in a heat source side in the embodiment of the present invention.

Next, a description is given of the method of determining and controlling whether to increase or decrease the number of secondary pumps 2 in operation so as to minimize the difference between the total flow quantity Q2 of heat source water flowing in the load system side B and the total flow quantity Q1 of heat source water flowing in the heat source side A. This is the second step ST2 shown in FIG. 3, and to be specific, is carried out according to the procedure shown in the flowchart of FIG. 5.

The control unit 15d determines whether the total flow quantity Q2 of heat source water flowing in the load system side B is equal to the total flow quantity Q1 of heat source water flowing in the heat source side A (ST21). If the total flow quantity Q2 of heat source water flowing in the load system side B is equal to the total flow quantity Q1 of heat source water flowing in the heat source side A (YES in ST21), the control unit 15d determines that no heat source water flows in the bypass pipe 14 and the heat sources 1 of the secondary pump-type heat source system S are efficiently operating. Accordingly, the heat source controller 15 controls the secondary pumps 2 so as to keep the state.

On the other hand, if the total flow quantity Q2 of heat source water flowing in the load system side B is not equal to the total flow quantity Q1 of heat source water flowing in the heat source side A (NO in ST21), the control unit 15d determines whether the requirement for reducing the number of secondary pumps 2 in operation is satisfied (ST22). If the control unit 15d determines that the requirement, for reducing the number of secondary pumps 2 in operation (hereinafter, referred to as a pump reducing requirement) is not satisfied (NO in ST22), the control unit 15d then determines whether the requirement for increasing the number of secondary pumps 2 in operation is satisfied (ST23). If the control unit 15c determines that the requirement for increasing the number of secondary pumps 2 in operation (hereinafter, referred to as a pump increasing requirement) is not satisfied (NO in ST23), the operating frequency of the secondary pumps 2, or the output frequency of the secondary pump inverters 3 is adjusted (ST24).

If neither the pump reducing nor increasing requirements are satisfied, the total flow quantity of heat source water flowing in the heat source side A can be set equal to the total flow quantity of heat source water flowing in the load system side B only by adjusting the operating frequency of the secondary pumps 2 without increasing or reducing the number of secondary pumps 2 in operation. This means that the heat sources 1 can be efficiently and properly operated according to the demands of the load systems 9. Herein, the number of secondary pumps 2 in operation is reduced or increased assuming that the secondary pumps 2 in operation have a same operating frequency.

In such a case, the control unit 15d adjusts the frequency of the secondary pumps 2 on a basis of the output frequency of the secondary pump inverters 3 currently used to operate the secondary pumps 2. This frequency adjustment cannot be finished at one time in some cases (NO in ST25) and is repeated until a proper frequency is determined. Herein, for example, PID control or the like is preferably used.

On the other hand, if the pump reducing requirement is satisfied (YES in ST22), the control unit 15d confirms that plural secondary pumps 2 are currently in operation (YES in ST26) and then instructs the calculation unit 15c to calculate a frequency (an initial frequency) used to operate the heat sources 1 after the number of secondary pumps 2 in operation is reduced (ST27).

Herein, it is confirmed that plural secondary pumps 2 are currently in operation and includes a secondary pump 2 which can be stopped because it is impossible to stop all the secondary pumps 2 in the secondary pump-type heat source system S. To be specific, if all of the secondary pumps 2 are stopped, the heat source water will not flow in the load system side B and the operating condition in the load system side B cannot be known. This prevents the heat source units from appropriately operating so as to respond to changes in the load system side B. Accordingly, if the number of secondary pumps 2 currently in operation is less than a predetermined number, for example, two (NO in ST26), the number of secondary pumps 2 in operation cannot be reduced, and the operation is continued without changes.

Moreover, examples of the pump reducing requirement include the following requirements: there is a heat source unit in which the secondary pump 2 is in operation while the heat source 1 is stopped with the compressor in the heat source 1 out of operation; and the frequency instructed to the secondary pump 2 reaches the minimum frequency at which the secondary pumps 2 can operate to reduce the flow quantity per heat source 1 to the minimum flow quantity of the heat source 1.

First, when there is a heat source unit in which the secondary pump 2 is in operation but the heat source 1 is stopped, the secondary pump 2 is operating just to maintain the flow quantity, and stopping the secondary pump 2 will not cause a problem. On the other hand, the flow quantity can be reduced by reducing the frequency of the secondary pumps 2 at ST24 if the frequency instructed to the secondary pumps 2 does not reach the minimum frequency at which the secondary pump 2 can operate to minimize the flow quantity per heat source 1.

In the embodiment of the present invention, the number of secondary pumps 2 in operation is reduced when the following requirements are satisfied in which: plural secondary pumps 2 are in operation when it is judged whether the aforementioned pump reducing requirements are satisfied and the two pump reducing requirements are both satisfied. These pump reducing requirements are just examples and can be arbitrarily set according to the state of the secondary pumps installed in the secondary pump-type heat source system S and the like.

If the pump reducing requirement is satisfied, the calculation unit 15c calculates a frequency (an initial frequency) used to operate the heat sources 1 after the number of secondary pumps 2 in operation is reduced. This initial frequency is calculated according to the following procedure.

First, the total flow quantity Q1 of heat source water flowing in the heat source side A is divided by the number of secondary pumps in operation at this calculation. The flow quantity per secondary pump 2 in operation (average flow quantity q0) is thus calculated. Next, based on the calculated average flow quantity q0 and the operating frequency f0 of the secondary pumps 2 at the calculation, a lifting height h0 of the heat source 1 is calculated.

Figure 6:
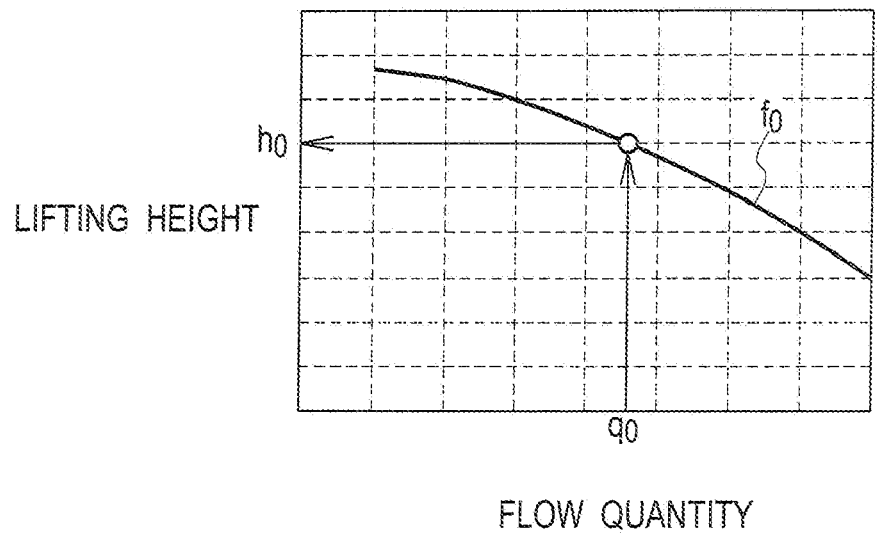
FIG. 6 is a graph showing a relation among three of average flow quantity, operating frequency, and lifting height at calculating the lifting height from the average flow quantity and operating frequency in the embodiment of the present invention.

FIG. 6 is a graph showing a relation among three of the average flow quantity q0, operating frequency f0, and lifting height h0 for calculating the lifting height h0 based on the average flow quantity q0 and operating frequency f0. The graph of FIG. 6 shows the lifting height in the vertical axis and the flow quantity in the horizontal axis. The storage unit 15b may store the approximate equation drawing the graph or a table of discrete values. As shown in FIG. 6, if the average flow quantity q0 and operating frequency f0 are known, the lifting height h0 of the heat source 1 can be calculated.

Herein, calculation of the initial frequency uses the lifting height for the following reasons. On the premise, plural secondary pumps 2 installed in the heat source side A operate at a same frequency. This is because if the secondary pumps 2 operate at different frequencies, the performances thereof differ from one another, and the control thereof is very difficult. This makes it difficult to perform smooth operation control, thus resulting in low efficiency operation. However, if the heat sources 1 operate using the same operating frequency as the previous one after the number of heat sources 1 is increased or reduced, it is prevented that heat source water is supplied so as to accurately respond to changes in the load system side B.

On the other hand, even when the number of secondary pumps 2 in operation is increased or reduced, the total flow quantity of heat source water flowing in the heat source side A does not change. For the total flow quantity of heat source water does not change, resistances inside the water supply and return pipes 6 and 7 do not change, and the lifting height required for the secondary pumps 2 do not change.

Accordingly, the lifting height of the secondary pumps 2 at the calculation of the initial frequency are once calculated, and the frequency, which allows the same lifting height to be maintained after the number of secondary pumps 2 in operation is increased or reduced, is then calculated. This makes it possible to smoothly operate the secondary pumps 2 using the frequency capable of accurately responding to changes in operation of the load system side B. As apparent in FIG. 6, if the average flow quantity q0 is known, the lifting height h0 of each heat source 1 can be calculated based on the point indicated by the operating frequency f0 and the average flow quantity q0.

When the number of secondary pumps 2 in operation is reduced, the flow quantity of heat source water flowing in each secondary pump 2 is calculated. For this is a case of reducing the number of secondary pumps 2 in operation, the number of secondary pumps 2 operated using the initial frequency is set to a number obtained by subtracting one from the number of secondary pumps 2 previously in operation. To be specific, the total flow quantity Q1 of heat source water flowing in the heat source side A is divided by the number obtained by subtracting one from the number of secondary pumps 2 previously in operation to obtain the flow quantity q1 per secondary pump 2 in operation at the initial frequency.

Figure 7:
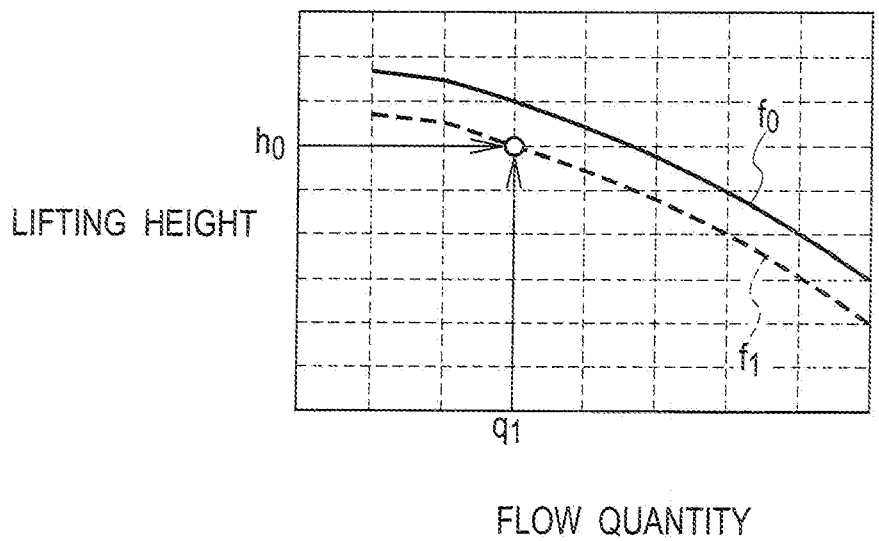
FIG. 7 is a graph showing a relation among the lifting height, average flow quantity, and initial frequency at calculating the initial frequency from the lifting height and the flow quantity per secondary pump when the number of secondary pumps in operation is reduced in the embodiment of the present invention.

The aforementioned procedure provides the lifting height h0 and the flow quantity q1 of heat source water per secondary pump 2 after the number of secondary pumps in operation is reduced. The frequency passing through the point indicated by the lifting height h0 and flow quantity q1 is calculated using the graph shown in FIG. 7. This frequency corresponds to the initial frequency f1.

When the initial frequency f1 used when the number of secondary pumps 2 in operation is reduced is calculated by the calculation unit 15c (ST27), the control unit 15d determines a secondary pump 2 to be stopped and instructs the instruction creation unit 15e to send a pump reduction instruction to the corresponding heat source unit. Based on the instruction, the instruction creation unit 15e sends the pump reduction instruction to the corresponding heat source unit through the transmission unit 15f (ST28).

As for the heat source units other than the heat source unit in which the secondary pump 2 is stopped, the initial frequency f1 calculated by the calculation unit 15c is transmitted to the inverters 3 of the secondary pumps 2 through the control unit 15d, instruction creation unit 15e, and transmission unit 15f (ST29). The secondary pumps 2 are operated at the transmitted initial frequency f1.

When the pump reducing requirement is not satisfied while the pump increasing requirement is satisfied (YES in ST23), the control unit 15d confirms that the secondary pumps 2 include a secondary pump 2 not in operation (YES in ST30). The control unit 15d then instructs the calculation unit 15c to calculate a frequency (an initial frequency) used to operate the heat sources 1 after the number of secondary pumps 2 is increased (ST31). If all of the secondary pumps 2 are in operation, the current operation is continued without any changes (NO in ST30).

It is confirmed that there is a secondary pump 2 not in operation because the number of secondary pumps 2 in operation cannot be increased even when the pump increasing requirement is satisfied if there is no secondary pump 2 not in operation.

Examples of the pump increasing requirements include the following requirements: the operating performances of all of the heat sources 1 with the secondary pumps 2 in operation exceed the maximum efficiency points and the flow quantity of heat source water per heat source 1 will not be below the minimum flow quantity if the number of secondary pumps 2 is increased; and the frequency instructed to the secondary pumps 2 reaches the maximum frequency with which the secondary pumps 2 can operate to increase the flow quantity per heat source 1 to the maximum flow quantity of the heat source 1.

In the embodiment of the present invention, the number of secondary pumps 2 in operation is increased when the requirement that at least one of the secondary pumps 2 is not in operation at the determination whether the pump increasing requirements are satisfied and any one of the aforementioned two pump increasing requirements is satisfied. The pump increasing requirements are just examples and can be arbitrarily set according to the state of the secondary pumps installed in the secondary pump-type heat source system S.

If the pump increasing requirements are satisfied, the calculation unit 15c calculates a frequency (an initial frequency) used to operate the secondary pumps 2 after the number of secondary pumps 2 in operation is increased. The way of calculating the initial frequency is the same as the aforementioned way for the pump reducing requirements.

First, the total flow quantity Q1 of heat source water flowing in the heat source side A is divided by the number of secondary pumps 2 in operation at the calculation. The flow quantity per secondary pumps 2 in operation (average flow quantity q0) is calculated. Next, based on the calculated average flow quantity q0 and the operating frequency f0 of the secondary pumps 2 at the calculation, the lifting height h0 of the heat source 1 is calculated.

The flow quantity q1 of heat source water flowing in each secondary pump 2 is calculated in the case where the number of secondary pumps 2 in operation is increased. To be specific, the total flow quantity Q1 of heat source water flowing in the heat source side A is divided by a number obtained by adding one to the number of secondary pumps 2 previously in operation to obtain the flow quantity q1 per secondary pump 2 operated using the initial frequency. Based on the lifting height h0 and flow quantity q1, the initial frequency f1 used to operate the secondary pumps 2 is calculated in the case where the number of secondary pumps 2 in operation is increased.

When the initial frequency f1 used when the number of secondary pumps 2 in operation is increased is calculated by the calculation unit 15c (ST31), the control unit 15d determines the heat source unit to be started and instructs the instruction creation unit 15e to send the pump increasing instruction to the heat source unit. Based on the instruction, the instruction creation unit 15e sends the pump increasing instruction to the heat source unit through the transmission unit 15f (ST32).

As for the heat source units including the heat source Unit to be started, the initial frequency f1 calculated by the calculation unit 15c is transmitted to the inverters 3 of the secondary pumps 2 through the control unit 15d, instruction creation unit 15e, and transmission unit 15f (ST33). The secondary pumps 2 are operated at the transmitted initial frequency f1.

By using the aforementioned configuration and control method, it is possible to provide a secondary pump-type heat source system and a secondary pump-type heat source control method which are capable of accurately responding to changes in the load system side without installing expensive flow meters and performing high efficiency control to contribute energy saving.

According to the secondary pump-type heat source system and the method of controlling the same, in particular, the flow quantity s of heat source water flowing in the heat source side and the load system side can be calculated by using only temperature sensors instead of flow meters. Accordingly, the entire system can be constructed at low cost. Moreover, it is possible to control the heat sources while always accurately responding to changes in the load system side by using the calculated flow quantities of heat source water flowing in the heat source side and load system side. It is therefore possible to efficiently operate the heat sources while contributing the energy saving.

The present invention is not limited to the aforementioned embodiment and can be embodied by modifying the constituent components without departing from the scope thereof. Moreover, the plurality of constituent components disclosed in the above embodiment are properly combined to form various kinds of the invention. For example, some of all the constituent components shown in the embodiment may be deleted. Furthermore, some of the constituent components of different embodiments are properly combined.

INDUSTRIAL APPLICABILITY

Hereinabove, the embodiment of the present invention is described. The above description just exemplifies the specific example and does not limit the present invention. The specific configuration of each part and the like can be properly changed. The operations and effects described in the embodiment are just the most preferable ones provided by the invention, and the operations and effects of the present invention are not limited by the description of the embodiment of the present invention. The present invention is used in a place requiring air conditioning of plural air conditioning areas such as a large-scale factory or building, for example.

The invention claimed is:

1. A secondary pump-type heat source system, comprising:
    a plurality of heat sources which are connected in parallel and generate heat source water;
    a load system in which the heat source water flows;
    a primary pump supplying the heat source water to the load system;
    a water supply pipe connecting an outlet of the heat source and the load system;
    a secondary pump which is provided for the heat source and supplies the heat source water subjected to heat exchange in the load system to the heat source;
    a water return pipe connecting an outlet of the load system and the secondary pumps;
    a bypass pipe allowing the water supply pipe and the water return pipe to communicate with each other;
    a water temperature sensor detecting temperature of the heat source water; and
    a heat source controller calculating flow quantity of the heat source water flowing in the heat source side and flow quantity of the heat source water flowing in the load system side by assigning a result from measurement by the water temperature sensor to an operation characteristic of each of the heat sources and controlling operation of the secondary pumps based on a result from the calculation.

2. The secondary pump-type heat source system according to claim 1, wherein
    the water temperature sensor comprises:
        a supply water temperature sensor measuring a temperature of the heat source water flowing through the water supply pipe between the heat source and the load system;
        a return water temperature sensor measuring a temperature of the heat source water flowing through the water return pipe between the load system and the secondary pumps;
        a heat source inlet water temperature sensor measuring temperature of the heat source water supplied to each heat source at an inlet of the heat source; and
        a heat source outlet water temperature sensor measuring a temperature of the heat source water supplied to the load system from each heat source at the outlet of the heat source, and
    the heat source controller comprises:
        a storage unit storing an operating characteristic of each heat source to be controlled;
        a calculation unit assigning results of measurement by the supply and return water temperature sensors and the heat source inlet and outlet water temperature sensors to the operating characteristics stored in the storage unit in order to calculate the flow quantities of the heat source water flowing in the heat source side and the load system side; and
        a control unit controlling operation of the secondary pumps based on a result calculated by the calculation unit.

3. A method of controlling a secondary pump-type heat source including:
    a plurality of heat sources which are connected in parallel and generate heat source water;
    a load system in which the heat source water flows;
    a primary pump supplying the heat source water to the load system;

a water supply pipe connecting an outlet of the heat source and the load system;

a secondary pump which is provided for each heat source and supplies the heat source water subjected to heat exchange in the load system to the heat source;

a water return pipe connecting an outlet of the load system and the secondary pumps; and a bypass pipe allowing the water supply pipe and the water return pipe to communicate with each other, the method comprising:

calculating flow quantity of the heat source water flowing in the heat source side and flow quantity of the heat source water flowing in the load system side, based on a temperature of the heat source water; and determining whether to increase or decrease the number of secondary pumps in operation to reduce a difference between the flow quantity in the heat source side and the flow quantity in the load system side, based on calculated flow quantities in the heat source side and the load system side, and controlling operation of the secondary pumps.

4. The method of controlling the secondary pump-type heat source system according to claim 3, wherein calculating the flow quantity of heat source water flowing in the load system side comprises:

calculating a performance of each heat source;

calculating the flow quantity of each heat source based on the calculated individual performance of the heat source and results obtained from a heat source inlet water temperature sensor measuring, at an inlet of the heat source, inlet water temperature of the heat source water supplied to the heat source and a heat source outlet water temperature sensor measuring, at the outlet of the heat source, outlet water temperature of the heat source water supplied from the heat source to the load system;

adding up the calculated flow quantities of the heat sources in order to calculate total flow quantity of the heat source water flowing in the heart source side;

averaging water temperatures obtained by all the heat source inlet water temperature sensors and averaging water temperatures obtained by all the heat source outlet water temperature sensors; and comparing an average of the outlet water temperatures of the heat sources with a supply water temperature measured by a supply water temperature sensor measuring a temperature of the heat source flowing in the water supply pipe between the heat sources and the primary pump;

in a case where the average of the outlet water temperatures of the heat sources is equal to the supply water temperature, calculating flow quantity of the heat source water flowing in the load system side by Using the total flow quantity of the heat source water flowing in the heat source side, an average of the inlet water temperatures of the heat sources, the average of the outlet water temperatures of the heat sources, and a return water temperature measured by a return water temperature sensor measuring temperature of the heat source water flowing through the water return pipe between the load system and the secondary pumps; and in a case where the average of the outlet water temperatures of the heat sources is lower than the supply water temperature, calculating flow quantity of the heat source water flowing in the load system side by using the total flow quantity of the heat source water flowing in the heat source side, the average of the inlet water temperatures of the heat sources, the average of the outlet water temperatures of the heat sources, the supply water temperature, and the return water temperature.

5. The method of controlling the secondary pump-type heat source according to claim 4, wherein controlling the secondary pumps in which a heat source controller changes performances to supply the heat source water based on a frequency comprises:

determining whether the flow quantity of heat source water flowing in the heat source side is equal to the flow quantity of heat source water flowing in the load system side;

if the flow quantity of the heat source water flowing in the heat source side is not equal to the flow quantity of the heat source water flowing in the load system side, determining whether a requirement for reducing the number of secondary pumps in operation is satisfied;

if the requirement for reducing the number of secondary pumps in operation is satisfied, calculating a frequency to drive the remaining secondary pumps at reducing the number of secondary pumps;

driving the secondary pumps using the frequency calculated at reducing the number of secondary pumps;

if the requirement for reducing the number of secondary pumps is not satisfied, determining whether a requirement for increasing the number of secondary pumps in operation is satisfied;

if the requirement for increasing the number of secondary pumps is satisfied, confirming the secondary pump not in operation and calculating a frequency to drive the secondary pump not in operation at increasing the number of secondary pumps;

driving the secondary pumps using the calculated frequency at increasing the number of secondary pumps; and if the requirements for increasing and reducing the number of secondary pumps in operation are not satisfied, adjusting the frequency to drive the secondary pumps.

* * * * *